(12) United States Patent
Imai (10) Patent No.: US 7,570,840 B2
(45) Date of Patent: Aug. 4, 2009

(54) DETERMINATION OF PORTRAIT AGAINST BACK LIGHT

(75) Inventor: Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 672 days.

(21) Appl. No.: 10/845,760

(22) Filed: May 14, 2004

(65) Prior Publication Data

US 2005/0036709 A1 Feb. 17, 2005

(30) Foreign Application Priority Data

May 16, 2003 (JP) ............................. 2003-138723

(51) Int. Cl.
*G06K 9/36* (2006.01)
*G06K 9/00* (2006.01)
(52) U.S. Cl. ...................... 382/286; 382/168
(58) Field of Classification Search ................. 382/286
See application file for complete search history.

(56) References Cited

U.S. PATENT DOCUMENTS

| | | | | |
|---|---|---|---|---|
| 5,940,530 | A * | 8/1999 | Fukushima et al. | 382/164 |
| 6,445,819 | B1 * | 9/2002 | Kinjo | 382/173 |
| 6,539,177 | B2 * | 3/2003 | Parulski | 396/287 |
| 6,577,821 | B2 * | 6/2003 | Malloy Desormeaux | 396/374 |
| 6,694,051 | B1 * | 2/2004 | Yamazoe et al. | 382/167 |
| 7,010,160 | B1 * | 3/2006 | Yoshida | 382/162 |
| 2002/0024609 | A1 * | 2/2002 | Matsushima | 348/362 |
| 2003/0053689 | A1 * | 3/2003 | Watanabe et al. | 382/167 |
| 2003/0071908 | A1 * | 4/2003 | Sannoh et al. | 348/345 |
| 2003/0128281 | A1 * | 7/2003 | Nihei et al. | 348/222.1 |
| 2003/0231324 | A1 * | 12/2003 | Kagaya | 358/1.9 |
| 2003/0231856 | A1 * | 12/2003 | Ikeda | 386/46 |

(Continued)

FOREIGN PATENT DOCUMENTS

JP 10-079885 3/1998

(Continued)

OTHER PUBLICATIONS

Abstract of Japanese Patent Publication No. 10-079885, Pub. Date: Mar. 24, 1998, Patent Abstracts of Japan.

(Continued)

*Primary Examiner*—Jingge Wu
*Assistant Examiner*—Max Shikhman
(74) *Attorney, Agent, or Firm*—Martine Penilla & Gencarella, LLP (57) ABSTRACT

A CPU 200 compares a luminance distribution characteristic of image data with a reference luminance distribution characteristic, and then confirms that the image data GD is a backlit portrait image data if similarity degree Sv between the luminance distribution characteristic of image data and the reference luminance distribution characteristic is larger than reference similarity degree Svref The CPU 200 determines whether an outer dark portion ratio Do is larger than a reference dark portion ratio Doref. If the CPU 200 determines that the outer dark portion ratio Do is larger than the reference dark portion ratio Doref, then it determines whether an outer bright portion ratio Bo is larger than a reference bright portion ratio Boref. If the CPU 200 determines that the outer bright portion ratio Bo is larger than a reference bright portion ratio Boref, then it determines that the image data GD is image data of backlit portrait image.

9 Claims, 8 Drawing Sheets

U.S. PATENT DOCUMENTS

| | | | |
|---|---|---|---|
| 2004/0120599 A1* | 6/2004 | Henley | 382/274 |
| 2004/0170316 A1* | 9/2004 | Saquib et al. | 382/162 |
| 2004/0201699 A1* | 10/2004 | Parulski et al. | 348/207.99 |
| 2004/0208363 A1* | 10/2004 | Berge et al. | 382/167 |

FOREIGN PATENT DOCUMENTS

| | | |
|---|---|---|
| JP | 11-120325 | 4/1999 |
| JP | 3018914 | 1/2000 |
| JP | 2002-204388 | 7/2002 |

OTHER PUBLICATIONS

Abstract of Japanese Patent Publication No. 11-120325, Pub. Date: Apr. 30, 1999, Patent Abstracts of Japan.

Abstract of Japanese Patent Publication No. 08-062741, Pub. Date: Mar. 8, 1996, Patent Abstracts of Japan.

Abstract of Japanese Patent Publication No. 2002-204388, Pub. Date: Jul. 19, 2002, Patent Abstracts of Japan.

* cited by examiner

DETERMINATION OF PORTRAIT AGAINST BACK LIGHT

BACKGROUND OF THE INVENTION

1. Field of the Invention

The present invention relates to a determination method of determining whether a shot image is a backlit portrait image and an image processing device having determination means.

2. Description of the Related Art

Taking a shot of foreground object such as person under a backlight condition against the sun or a light source typically results in an image having a background of larger luminance and the object or person of smaller luminance. In such a case, electric flash may be forced to increase the luminance of the object, so that details of the person such as facial expression can be taken with clarity according to the photographer's intention. However, the photographer does not always force the electric flash to emit.

In the case of taking a shot of object by a digital still camera (DSC), it is possible to perform image processing on the generated image data with relative ease. A variety of image processing techniques for image data have been proposed and are in practical use. Such image processing techniques include contrast correction, brightness correction, and color saturation correction based on given correction conditions selected by a user, and so-called automatic image quality adjustment such as contrast correction, brightness correction, and saturation correction based on the analysis results of the image data.

In the conventional image processing techniques, however, the analysis of image data characteristic may fail to properly determine whether the shot image is a portrait image under a backlight condition. In such a case, the user must determine proper photography conditions of the image data. That is, the automatic image processing by a personal computer may fail to successfully determine whether the image data is image data of backlit portrait image, and thereby preventing the automatic processing from being performed on the image data of backlit portrait image.

SUMMARY OF THE INVENTION

In order to solve the above problems, the present invention is intended to analyze image data to properly determine whether a shot image is an image of foreground object such as portrait image under a backlight condition.

In order to solve the above problems, a first aspect of the present invention provides a method of determining based on image data of a shot image whether the shot image is a backlit portrait image. The method according to the first aspect of the present invention includes: acquiring the image data; analyzing the acquired image data on a pixel-by-pixel basis to determine whether the shot image is a backlit portrait image; analyzing the acquired image data on a pixel-by-pixel basis to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image; analyzing the acquired image data on a pixel-by-pixel to determine whether a ratio of number of bright outer area pixels having luminance not smaller than the reference luminance to the total number of outer area pixels is not smaller than a second predetermined value; and concluding that the shot image is a backlit portrait image if the shot image is determined to be a backlit portrait image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value.

The method according to the first aspect of the present invention concludes that the shot image is a backlit portrait image if the shot image is determined to be a backlit portrait image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value, and due to such an analysis of image data ensuring proper determination on whether the shot image is an image of foreground object such as portrait image under a backlight condition. In addition, using the ratio of number of pixels for the determination based on dark pixels or bright pixels ensures more accurate determination on whether the image data is image data of backlit portrait image.

In the method according to the first aspect of the present invention, the determination whether the shot image is a backlit portrait image may include: acquiring a luminance distribution characteristic of the image data analyzed on a pixel-by-pixel basis; comparing the acquired luminance distribution characteristic with a reference luminance distribution characteristic for backlit portrait image determination prepared in advance; and determining that the shot image is a backlit portrait image if the acquired luminance distribution characteristic is similar to the luminance distribution characteristic for backlit portrait image determination. This configuration uses the similarity degree between the luminance distribution characteristic of the image data and the luminance distribution characteristic for backlit portrait image determination to easily and properly determine whether the shot image is a backlit portrait image.

In the method according to the first aspect of the present invention, the determination whether the shot image is a backlit portrait image may include: determining whether a ratio of number of flesh color pixels among the inner area pixels to the total number of the inner area pixels is not smaller than a third predetermined value; determining whether average luminance of flesh color pixels among the inner area pixels and the outer area pixels is not larger than a fourth predetermined value; and determining that the shot image is a backlit portrait image if the ratio of number of flesh color pixels among the inner area pixels to the total number of the inner area pixels is not smaller than the third predetermined value, and the average luminance of flesh color pixels among the inner area pixels and the outer area pixels is not larger than the fourth predetermined value. This configuration uses the ratio of number of flesh color pixels among the inner area pixels to the total number of the inner area pixels, and therefore ensuring proper determination on whether the shot image is a portrait image, while uses the average luminance of flesh color pixels among the inner area pixels and the outer area pixels, and therefore ensuring proper determination on whether the portrait image is a backlit portrait image.

A second aspect of the present invention provides a method of determining based on image data of a shot image whether the shot image is a backlit portrait image. The method according to the second aspect of the present invention includes:

acquiring the image data; and analyzing the acquired image data on a pixel-by-pixel basis to determine whether the shot image is a portrait image, and further includes, if the shot image is determined to be a portrait image, analyzing the acquired image data on a pixel-by-pixel basis to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image; analyzing the acquired image data on a pixel-by-pixel to determine whether a ratio of number of bright outer area pixels having luminance not smaller than the reference luminance to the total number of outer area pixels is not smaller than a second predetermined value; and determining that the shot image is a backlit portrait image if the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value.

The method according to the second aspect of the present invention determines that the shot image is a backlit portrait image if the shot image is determined a portrait image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value, and due to such an analysis of image data ensuring proper determination on whether the shot image is an image of foreground object such as portrait image under a backlight condition. In addition, using the ratio of number of pixels for the determination based on dark pixels or bright pixels ensures more accurate determination on whether the image data is image data of backlit portrait image.

In the method according to the second aspect of the present invention, the determination whether the shot image is a portrait image may be based on a ratio of number of flesh color pixels among the inner area pixels to the total number of the inner area pixels, and it may be determined that the shot image is a portrait image if the ratio of number of flesh color pixels among the inner area pixels to the total number of the inner area pixels is not smaller than the third predetermined value. This configuration uses the ratio of number of flesh color pixels among the inner area pixels to the total number of the inner area pixels, and therefore ensuring proper determination on whether the shot image is a portrait image.

In the method according to the first or second aspect of the present invention, the reference luminance may include dark pixel reference luminance for the determination of dark pixel and bright pixel reference luminance for the determination of bright pixel. This configuration ensures more proper determination on whether the image data is image data of backlit portrait image.

A third aspect of the present invention provides a method of determining based on image data of a shot image whether the shot image is a backlit portrait image. The method according to the third aspect of the present invention includes: acquiring the image data; analyzing the acquired image data on a pixel-by-pixel basis to acquire a luminance distribution characteristic of the image data; comparing the acquired luminance distribution characteristic with reference a luminance distribution characteristic for backlit portrait image determination prepared in advance; determining whether a ratio of number of flesh color pixels among inner area pixels to total number of the inner area pixels is not smaller than a first predetermined value, the inner area pixels constituting image data corresponding to a central portion of the shot image; determining whether average luminance of flesh color pixels among the inner area pixels and outer area pixels is not larger than a second predetermined value, the outer area pixels being other than the inner area pixels among all pixels constituting the image data; and determining that the shot image is a backlit portrait image if the acquired luminance distribution characteristic is similar to the reference luminance distribution characteristic for backlit portrait image determination, the ratio of number of flesh color pixels among the inner area pixels to the total number of the inner area pixels is not smaller than the first predetermined value, and the average luminance of flesh color pixels among the inner area pixels and the outer area pixels is not larger than the second predetermined value.

The method according to the third aspect of the present invention determines that the shot image is a backlit portrait image if the acquired luminance distribution characteristic is similar to the reference luminance distribution characteristic for backlit portrait image determination, the ratio of number of flesh color pixels among the inner area pixels to the total number of the inner area pixels is not smaller than the first predetermined value, and the average luminance of flesh color pixels among the inner area pixels and the outer area pixels is not larger than the second predetermined value, and due to such an analysis of image data ensuring proper determination on whether the shot image is an image of foreground object such as portrait image under a backlight condition. In addition, using the ratio of number of pixels to determine based on flesh color pixels whether the image data is image data of portrait image ensures more accurate determination on whether the image data is image data of portrait image. Furthermore, the determination on whether the image data is image data of backlit portrait image uses the similarity degree between the luminance distribution characteristic of the image data and the luminance distribution characteristic for backlit portrait image determination, and the average luminance of flesh color pixels among the inner area pixels and the outer area pixels, and therefore ensuring easy and proper determination on whether the portrait image is a backlit portrait image.

A fourth aspect of the present invention provides an image processing device for determining based on image data of a shot image whether the shot image is a backlit portrait image. The image processing device according to the fourth aspect of the present invention includes: an image data acquisition module for acquiring the image data; a backlit portrait image determination module for analyzing the acquired image data on a pixel-by-pixel basis to determine whether the shot image is a backlit portrait image; a dark pixel ratio determination module for analyzing the acquired image data on a pixel-by-pixel basis to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image; a bright pixel ratio determination module for analyzing the acquired image data on a pixel-by-pixel to determine whether a ratio of number of bright outer area pixels having luminance not smaller than the reference luminance to the total number of outer area pixels is not smaller than a second predetermined value; and a backlit portrait image confirmation module for confirming that the shot image is a backlit portrait image if the shot image is determined to be a backlit portrait image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value.

The image processing device according to the fourth aspect of the present invention provides the same functions and effects as the method according to the first aspect of the present invention. In addition, the image processing device according to the fourth aspect of the present invention may take a variety of aspects as the method according to the first aspect of the present invention.

A fifth aspect of the present invention provides an image processing device for determining based on image data of a shot image whether the shot image is a backlit portrait image. The image processing device according to the fifth aspect of the present invention includes: an image data acquisition module for acquiring the image data; a portrait image determination module for analyzing the acquired image data on a pixel-by-pixel basis to determine whether the shot image is a portrait image; a dark pixel ratio determination module for analyzing the acquired image data on a pixel-by-pixel basis to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image; a bright pixel ratio determination module for analyzing the acquired image data on a pixel-by-pixel to determine whether a ratio of number of bright outer area pixels having luminance not smaller than the reference luminance to the total number of outer area pixels is not smaller than a second predetermined value; and a backlit portrait image determination module for determining that the shot image is a backlit portrait image if the shot image is determined to be a portrait image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value.

The image processing device according to the fifth aspect of the present invention provides the same functions and effects as the method according to the second aspect of the present invention. In addition, the image processing device according to the fifth aspect of the present invention may take a variety of aspects as the method according to the second aspect of the present invention.

A sixth aspect of the present invention provides an image processing device for determining based on image data of a shot image whether the shot image is a backlit portrait image. The image processing device according to the sixth aspect of the present invention includes: an image data acquisition module for acquiring the image data; a luminance distribution characteristic analysis module analyzing the acquired image data on a pixel-by-pixel basis to acquire a luminance distribution characteristic of the image data; and a comparison module for comparing the acquired luminance distribution characteristic with a reference luminance distribution characteristic for backlit portrait image determination prepared in advance; an inner flesh color pixel ratio determination for determining whether a ratio of number of flesh color pixels among inner area pixels to total number of the inner area pixels is not smaller than a first predetermined value, the inner area pixels constituting image data corresponding to a central portion of the shot image; a flesh color pixel average luminance determination module for determining whether average luminance of flesh color pixels among the inner area pixels and outer area pixels is not larger than a second predetermined value, the outer area pixels being other than the inner area pixels among all pixels constituting the image data; and a backlit portrait image determination module for determining that the shot image is a backlit portrait image if the acquired luminance distribution characteristic is similar to the reference luminance distribution characteristic for backlit portrait image determination, the ratio of number of flesh color pixels among the inner area pixels to the total number of the inner area pixels is not smaller than the first predetermined value, and the average luminance of flesh color pixels among the inner area pixels and the outer area pixels is not larger than the second predetermined value.

The image processing device according to the sixth aspect of the present invention provides the same functions and effects as the method according to the third aspect of the present invention. In addition, the image processing device according to the sixth aspect of the present invention may take a variety of aspects as the method according to the third aspect of the present invention.

The determination methods according to the first through third aspects of the present invention may also be embodied as a determination program or a recording medium that stores such a determination program therein.

DETAILED DESCRIPTION OF THE PREFERRED EMBODIMENTS

The following describes an image processing device and a method for determination of backlit portrait image according to the present invention based on embodiments with reference to the drawings.

First Embodiment

A. Configuration of Image Processing System

Figure 1:
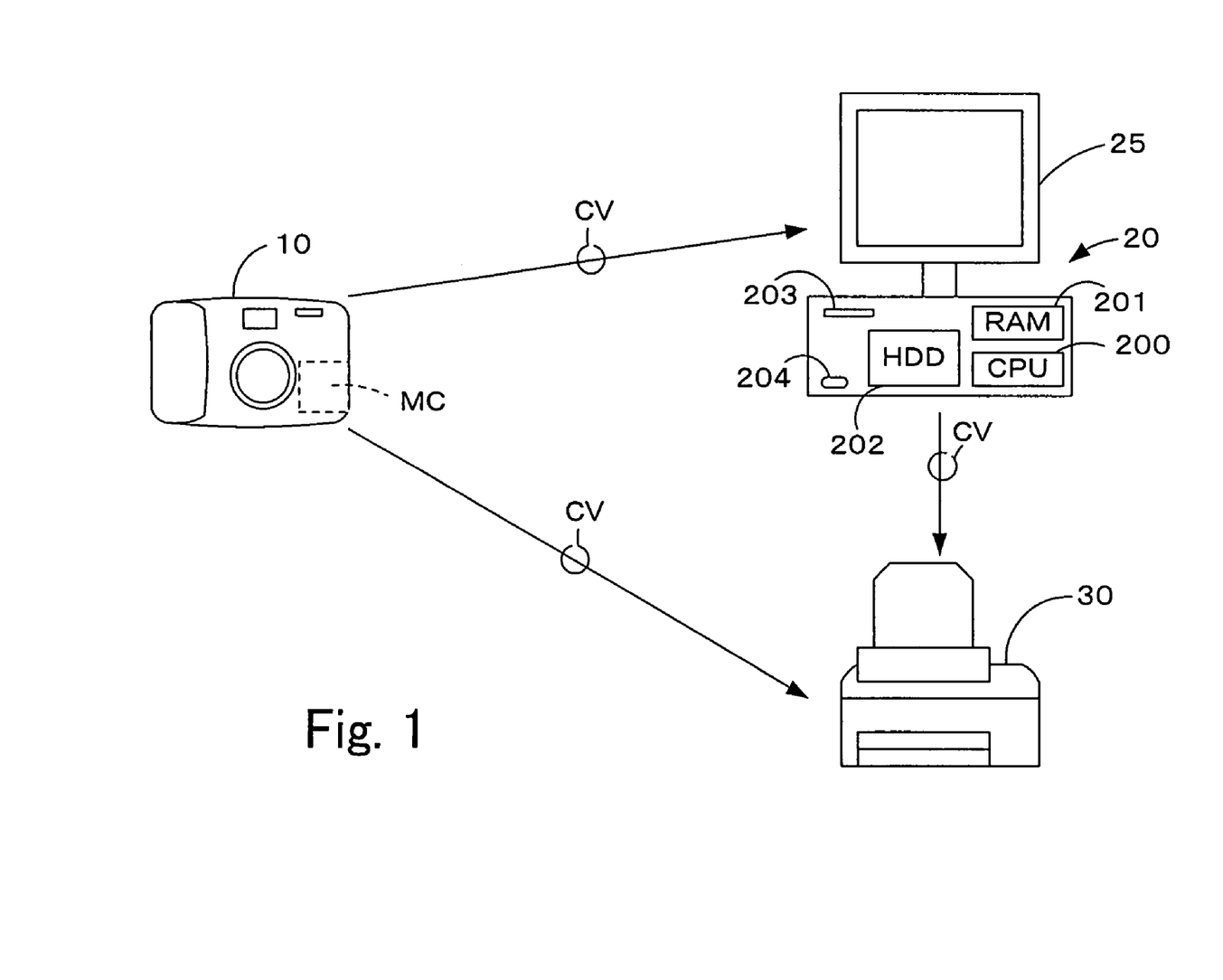
FIG. 1 is a schematic diagram illustrating an exemplary image processing system that includes a personal computer as an image processing device according to a first embodiment.

A configuration of an image processing system to which an image processing device according to a first embodiment may be applied is described with reference to FIG. 1. FIG. 1 is a schematic diagram illustrating an exemplary image processing system that includes a personal computer as the image processing device according to the first embodiment.

The image processing system includes a digital still camera 10 as an input device that generates image data, a personal computer 20 as an image processing device that determines on whether the image data generated by the digital still camera 10 is image data of backlit portrait image and that performs image processing to output print image data, and a color printer 30 as an output device that uses the print image data to output the image. Alternatively, the color printer 30 may have the functions of image processing as included in the personal computer PC. In such a case, the color printer 30 can perform both image processing and image output in a stand-alone mode. The output device may include a monitor 25 such as CRT display and LCD display, a projector, and the like as well as the printer 30. The color printer 30 connected with the personal computer 20 is used as the output device in the following description.

The personal computer 20 is a generally used type of computer that includes a CPU 200 that performs an image processing program including a backlit portrait image determination processing program having modules such as backlit portrait image determination module, dark pixel ratio determination module, bright pixel ratio determination module, and backlit portrait image confirmation module, a RAM 201 that temporally stores data such as results of operation by the CPU 200 and image data, and a hard disk drive (HDD) 202 that stores the image processing program. The personal computer 20 also includes a card slot 203 for receiving a memory card MC; and an input/output terminal 204 for receiving a connecting cable from the digital still camera 10 and the like.

The digital still camera 10, which acquires an image by causing optical information to form the image in a digital device (e.g. a CCD or photomultiplier tube), includes a photoelectric conversion circuit having a CCD and the like for converting the optical information into electrical information, an image acquisition circuit for controlling the photoelectric conversion circuit to acquire the image, and an image processing circuit for processing the acquired digital image. The digital still camera 10 stores the acquired image as digital data into the memory card MC as a storage device. Although the storage format of image data used by the digital still camera 10 is generally JPEG data format as a lossy compression storage mode and TIFF data format as a lossless compression storage mode, other storage formats such as RAW data format, GIF data format, and BMP data format may also be used.

The image data generated by the digital still camera 10 is transmitted to the color printer 30, for example, via a cable CV and the computer 20, or via a cable CV. Alternatively, the image data is transmitted to the color printer 30 via the computer 20 having the memory card MC, on which the image file GF was stored by the digital still camera 10, inserted in the memory card slot, or via a direct connection of the memory card MC to the color printer 30. The following describes the case where the personal computer 20 performs the image processing on the image data and then the processed image data is output to the color printer 30.

The color printer 30, which is capable of outputting a color image, may include a jet ink type printer which ejects inks of four colors including cyan (C), magenta (M), yellow (Y) and black (K) onto a printing medium to form a dot pattern and thus the image. Alternately, the color printer 30 may include an electrophotographic type printer which transfers and fixes color toner on the printing medium to form the image. In addition to the above four colors, the color inks may include light cyan (LC), light magenta (LM), and dark yellow (DY).

Figure 2:
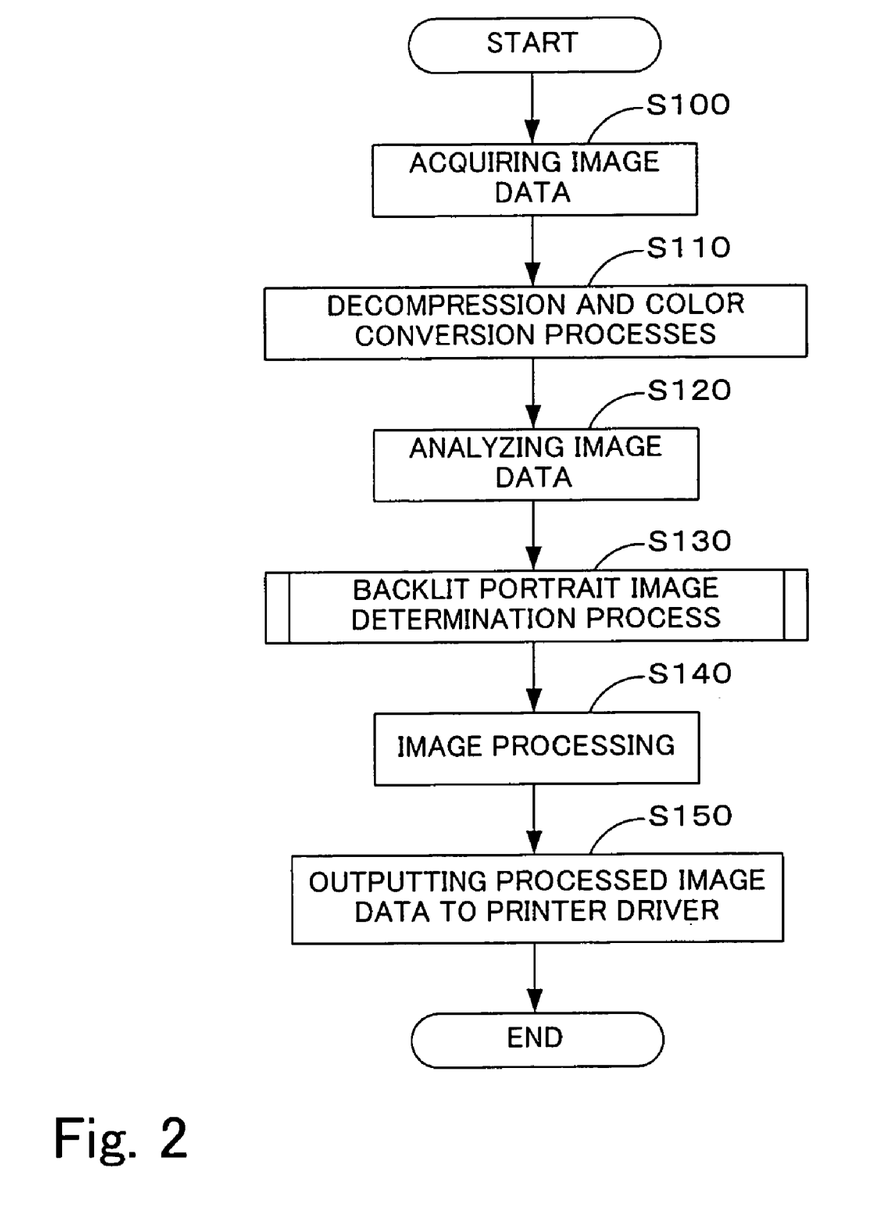
FIG. 2 is a flowchart that shows a processing routine of image processing to be performed by the personal computer according to the first embodiment.
Figure 3:
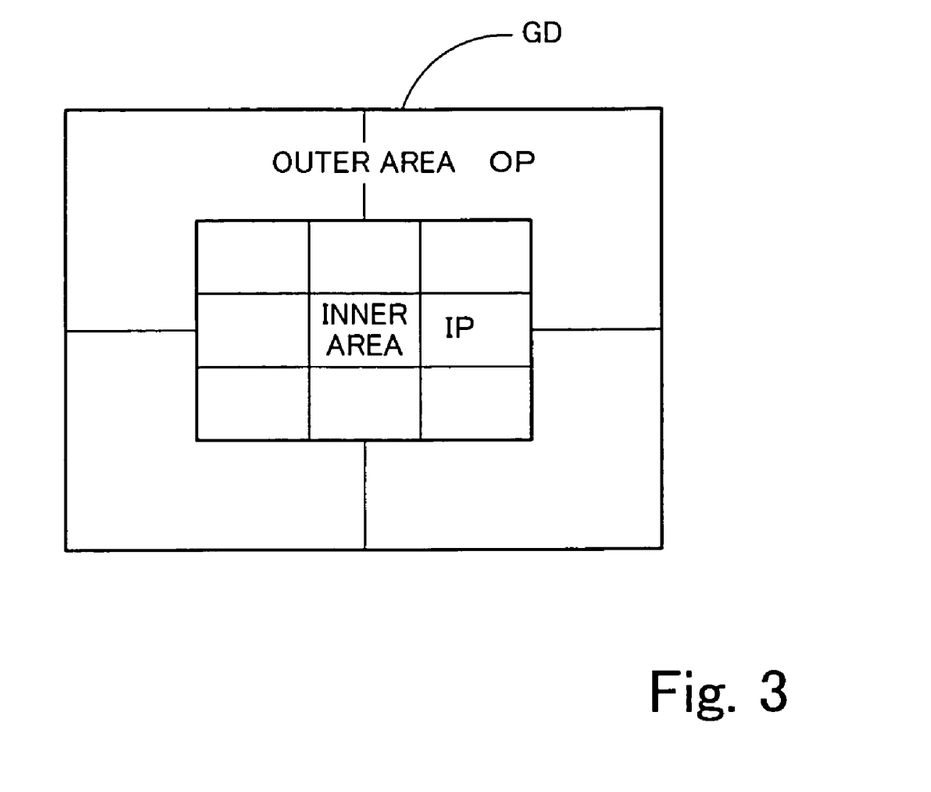
FIG. 3 is a schematic diagram illustrating an exemplary segmentation between inner area pixels and outer area pixels when analyzing image data on a pixel-by-pixel basis.
Figure 4:
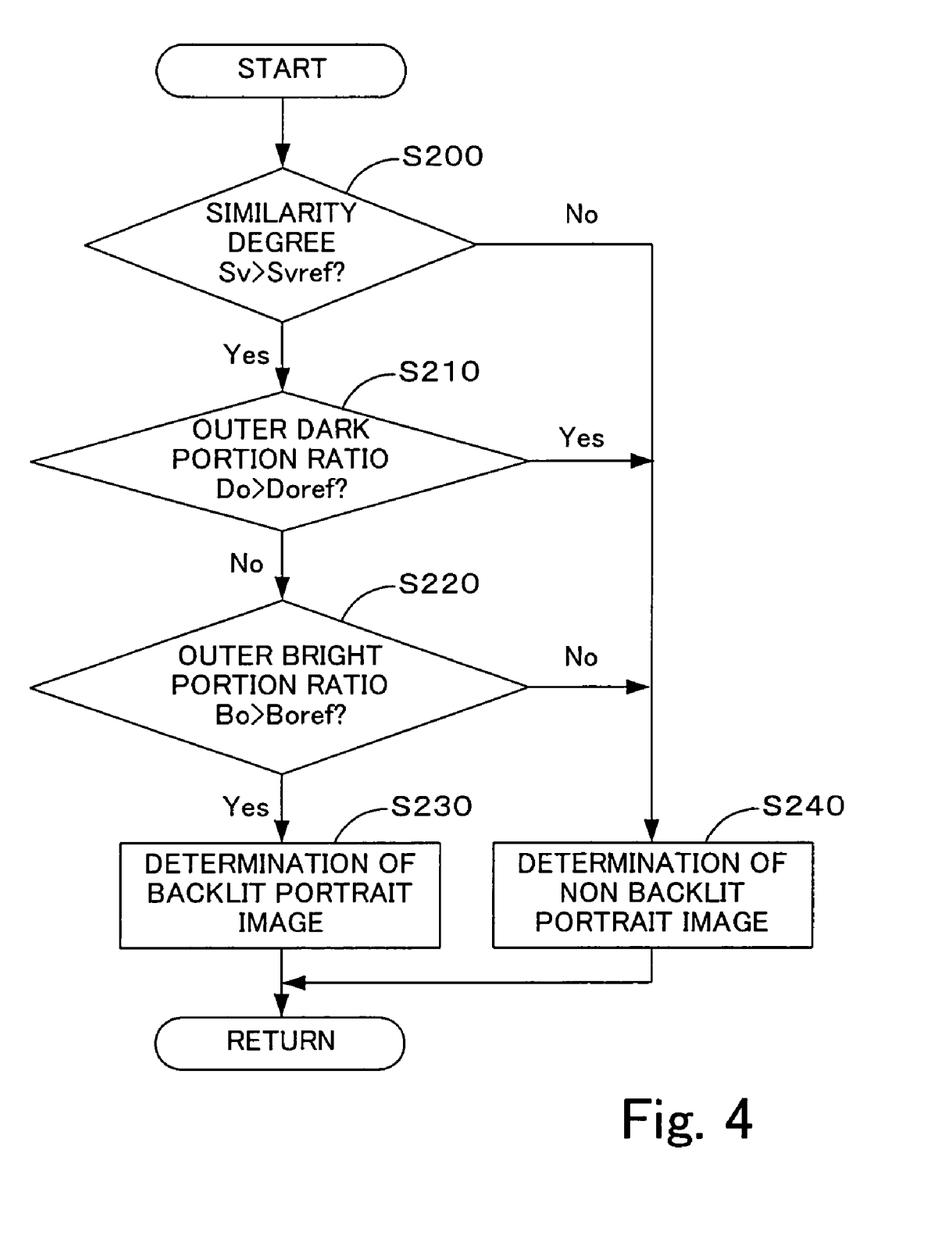
FIG. 4 is a flowchart showing a processing routine of backlit portrait image determination process according to the first embodiment.
Figure 5:
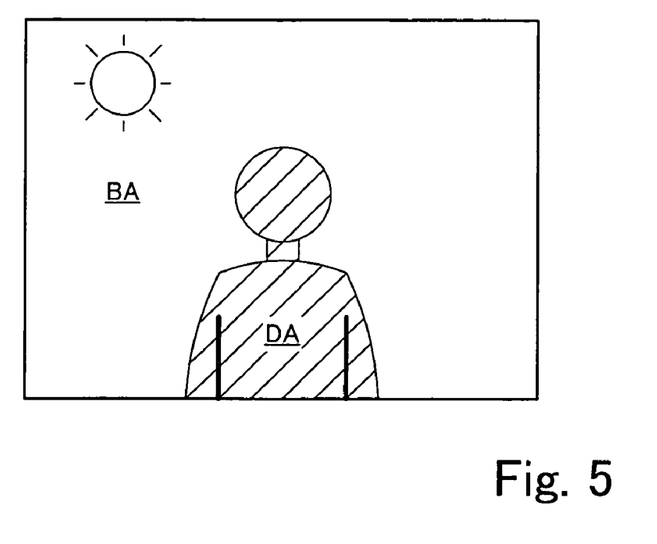
FIG. 5 is a conceptual schematic diagram illustrating the image data of backlit portrait image developed on a memory.
Figure 6:
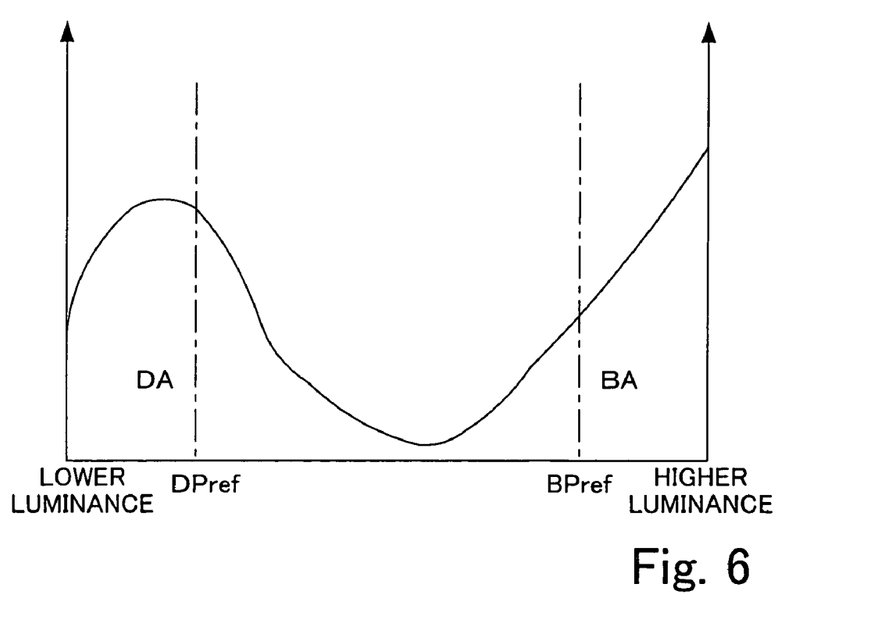
FIG. 6 is a schematic diagram showing a luminance distribution characteristic regarding pixel data that is acquired by analyzing the image data shown in FIG. 5 on a pixel-by-pixel basis.
Figure 7:
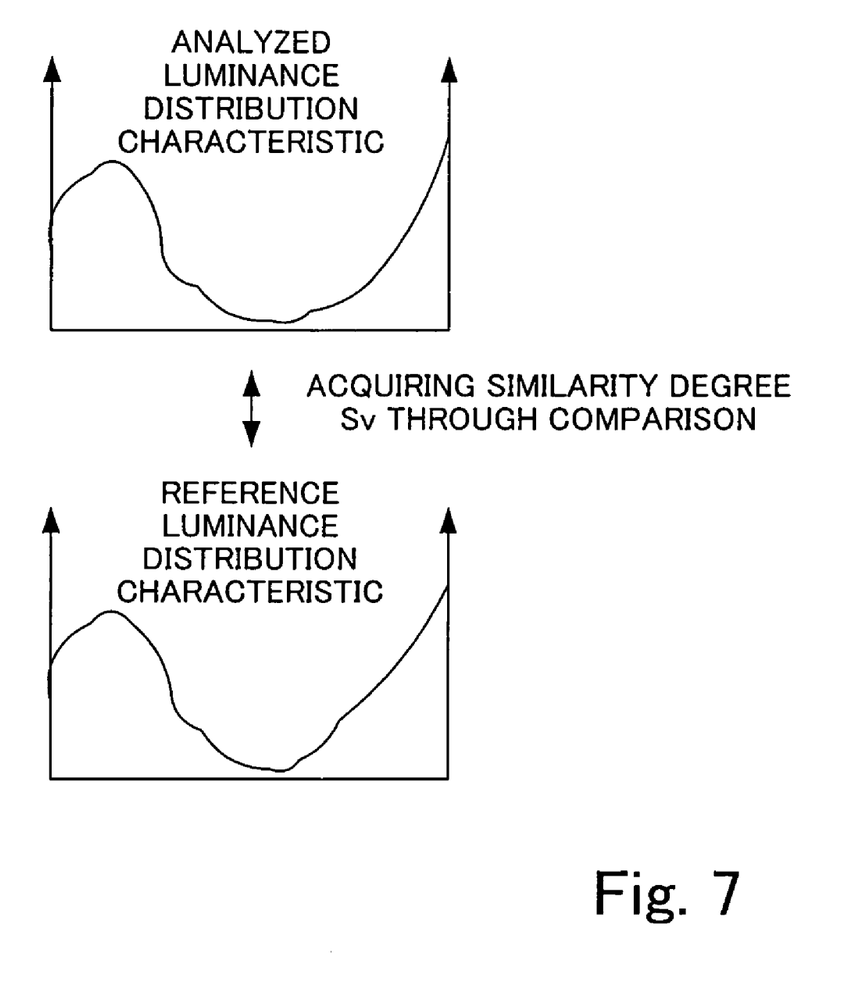
FIG. 7 is a schematic diagram showing an exemplary comparison between an analyzed luminance distribution characteristic acquired by analyzing the image data of FIG. 5 and a reference luminance distribution characteristic of backlit portrait image data that is used as a reference data.

B. Image Processing by Personal Computer 20:

The image processing to be performed by the personal computer 20 is described with reference to FIGS. 2 to 7. FIG. 2 is a flowchart that shows a processing routine of image processing to be performed by the personal computer according to the first embodiment. FIG. 3 is a schematic diagram illustrating an exemplary segmentation between inner area pixels and outer area pixels when analyzing the image data on a pixel-by-pixel basis. FIG. 4 is a flowchart showing a processing routine of backlit portrait image determination process according to the first embodiment. FIG. 5 is a conceptual schematic diagram illustrating the image data of backlit portrait image developed on the memory. FIG. 6 is a schematic diagram showing a luminance distribution characteristic regarding pixel data that is acquired by analyzing the image data shown in FIG. 5 on a pixel-by-pixel basis. FIG. 7 is a schematic diagram showing an exemplary comparison between an analyzed luminance distribution characteristic acquired by analyzing the image data of FIG. 5 and a reference luminance distribution characteristic of backlit portrait image data that is used as a reference data.

When the memory card MC is inserted into the card slot 203 or when the connecting cable CV that is connected to the digital still camera 10 is connected to the input/output terminal 204, the personal computer 20 (CPU 200) activates a program for the image processing. The CPU 200 acquires (reads out) the image data from the memory card MC according to user's instruction and temporarily stores the acquired image data into the RAM 201 (step S100).

The CPU 200 performs data decompression and color conversion processes on the image data (step S130). Specifically, the CPU 200 decompresses the image data GD and then performs a matrix operation using a matrix S on the decompressed image data GD to attain color conversion from YCbCr to RGB.

The image data used in this embodiment contains JPEG image data, into which YCbCr data is compressed. On the other hand, RGB data is generally used in the image processing performed by current personal computers PC and printers. It is therefore required to perform the decompression (decoding) on JPEG data and the color conversion process from YCbCr data to RGB data. The matrix S is generally used for conversion from YCbCr data to RGB data in the JFIF standard and is well-known to those skilled in the art. Therefore, the matrix is not described in further detail.

The CPU 200 then analyzes the image data GD converted into RGB data on a pixel-by-pixel basis (step S120). When analyzing the image data GD on a pixel-by-pixel basis (pixel data basis), the image data GD (pixel data) is segmented into inner area pixels IP corresponding to the central portion of the image and outer area pixels OP corresponding to the other area of the image, as shown in FIG. 3. The inner area and the outer area are further segmented into smaller portions. The CPU 200 acquires, for example, the luminance distribution characteristic of the image data GD through this analysis. If the image data GD corresponds to a portrait image taken under a backlight condition as shown in FIG. 5, the luminance distribution characteristic of the image data GD is as shown in FIG. 6, for example. As described above, FIG. 5 conceptually illustrates the image data GD developed on the memory.

The CPU 200 also calculates average luminance Save of flesh color pixels among all pixels constituting the image data GD, a ratio Sir of number of flesh color pixels to total number of inner area pixels in the inner area, a ratio Do of number of dark pixels to total number of outer area pixels in the outer area, and a ratio Bo of bright pixels to total number of outer area pixels in the outer area. For example, a threshold value DPref for determination of dark pixel and a threshold value BPref for determination of bright pixel shown in FIG. 6 are used to determine whether a target pixel corresponds to either dark pixel or bright pixel. In this case, the target pixel is a dark pixel if the luminance of the target pixel is smaller than the threshold value DPref for determination of dark pixel while the target pixel is a bright pixel if the luminance is larger than the threshold value BPref for determination of bright pixel. Alternatively, a common threshold value may be used for such determination where the target pixel is a dark pixel if the luminance of the target pixel is smaller than the common threshold value while the target pixel is a bright pixel if the luminance is larger than the common threshold value.

Once the CPU 200 has analyzed the image data GD, it performs the backlit portrait image determination process to determine whether the shot image corresponding to the image data GD is a backlit portrait image (step S130). The backlit portrait image determination process is described below with reference to FIG. 4.

The CPU 200 compares the acquired luminance distribution characteristic of the image data GD with the reference luminance distribution characteristic of image data of backlit portrait image stored on the HDD 202 in advance to determine whether a similarity degree Sv between the acquired luminance distribution characteristic and the reference luminance distribution characteristic is larger than a reference similarity degree Svref (step S200). Since the backlit portrait image data is divided broadly into a bright background area BA and a dark object (person) area DA as shown in FIG. 5, the luminance distribution of the backlit portrait image (or image data) has two peaks i.e. one in a range of smaller luminance and the other in a range of larger luminance as shown in FIG. 6. The reference luminance distribution characteristic, which is acquired by analyzing the image data of the reference backlit portrait image in advance and which is used to determine whether the image data GD corresponds to a backlit portrait image, also has two peaks i.e. one in a range of smaller luminance and the other in a range of larger luminance.

The CPU 200 compares the luminance distribution characteristic acquired through the analysis with the reference luminance distribution characteristic to calculate the similarity degree Sv between the acquired luminance distribution characteristic and the reference luminance distribution characteristic as shown in FIG. 7. The calculation of similarity degree Sv is performed by using a feature vector indicating a feature of pattern of the acquired luminance distribution characteristic and a feature vector of the reference luminance distribution characteristic prepared in advance.

If the CPU 200 determines that the calculated similarity degree Sv is larger than the reference similarity degree Svref (Yes at step S200), then it performs the following processing for confirming that the image data GD is image data of backlit portrait image. The feature of having two peaks in a portion of smaller luminance and in a portion of larger luminance may appear in a night scene portrait image that was taken by using an electric flash against a dark background (e.g. night scene) as well as a backlit portrait image. Therefore, performing the processing for confirmation along with the determination using the luminance distribution characteristic of image data GD ensures more accurate determination on whether the image data GD corresponds to a backlit portrait image.

During the confirmation processing, the CPU 200 determines whether the outer dark portion ratio Do representing a ratio of number of dark pixels to total number of pixels in the outer area is larger than a reference dark portion ratio Doref (step S210). The reference dark portion ratio Doref may include, for example, a ratio of number of dark pixels to total number of pixels in the outer area in the case that outer area pixels (or background pixels) correspond to a dark background such as night scene. Consequently, the CPU 200 can determine whether the image data GD has dark outer area pixels (or background pixels) that correspond to a night scene or the like.

If the CPU 200 determines that the outer dark portion ratio Do is not larger than the reference dark portion ratio Doref (No at step S210), it determines that the image data GD does not include any dark outer area pixel, and then determines whether the outer bright portion ratio Bo representing a ratio of number of bright pixels to total number of pixels in the outer area is larger than the reference bright portion ratio Boref (step S220). The reference bright portion ratio Boref may include, for example, a ratio of number of bright pixels to total number of pixels in the outer area in the case that outer area pixels (or background pixels) correspond to a bright background such as backlit scene. Consequently, the CPU 200 can determine whether the image data GD has bright outer area pixels (or background pixels) that correspond to a backlit scene or the like.

If the CPU 200 determines that the outer bright portion ratio Bo representing a ratio of number of bright pixels to total number of pixels in the outer area is larger than the reference bright portion ratio Boref (Yes at step S220), then it determines that the image data GD includes bright outer area pixels. Consequently, the CPU 200 determines with high accuracy that the image data GD is image data of backlit portrait image (step S230), and then returns back to the image processing routine of FIG. 2.

On the contrary, if the CPU 200 determines that the calculated similarity degree Sv is not larger than the reference similarity degree Svref (No at step S200), determines that the outer dark portion ratio Do is larger than the reference dark portion ratio Doref (Yes at step S210), or determines that the outer bright portion ratio Bo is not larger than the reference bright portion ratio Boref (No at step S220), it determines that the image data GD is image data of non-backlit portrait image (step S240), and then return back to the image processing routine of FIG.2.

Referring back to FIG. 2, if the CPU 200 performs image processing suitable for backlit portrait images if it has determined that the image data GD is image data of backlit portrait image while it performs normal image processing if it has determined that the image data GD is image data of non-backlit portrait image (step S140). Correction suitable for image data of backlit portrait image includes, for example, a correction that increases brightness (luminance) of the image data.

The CPU 200 outputs the image data that has undergone the image processing to a printer driver (step S150) and exits the processing routine. The printer driver performs color conversion processing for converting the image data (RGB data) into CMYK data. That is, the color system of the image data is converted into the CMYK color system used by the color printer 20 to perform print processing. Specifically, this conversion is performed using a look-up table that is stored on the HDD 202 (or ROM) and that associates the RGB color system with the CMYK color system. The image data also undergoes halftone processing and resolution conversion processing, and is then output to the color printer 30 in the form of raster data for printing.

As described above, the image processing device and the method for determination of backlit portrait image according to the first embodiment can properly determine based on the analysis results of image data whether the image data (or shot image) to be processed is image data of backlit portrait image. That is, the backlit portrait image determination that uses the similarity degree Sv between the luminance distribution characteristic of image data and the reference luminance distribution characteristic is expected to ensure proper determination of backlit portrait image even if using only the single image data while it may also determine that image data of portrait on a night scene, which may have a similar luminance distribution characteristic as backlit portrait image, is image data of backlit portrait image.

On the other hand, the first embodiment may use as one of determination factors the outer dark portion ratio Do representing a ratio of dark pixels in the outer area to determine whether the image data to be processed has a dark background or is image data of night scene image, and may also use as one of determination factors the outer bright portion ratio Bo representing a ratio of bright pixels in the outer area to determine whether the image data to be processed has a bright background or is image data of backlit image. This can eliminate the possibility of determining that the image data of portrait on a night scene is a backlit portrait image data, and thus can determine with higher accuracy whether the image data to be processed is image data of backlit portrait image in conjunction with the backlit portrait image determination using the similarity degree Sv between the luminance distribution characteristic of image data and the reference luminance distribution characteristic.

In addition, the determination on whether the image data to be processed corresponds to an image having a dark background and the determination on whether the image data to be processed corresponds to an image having a bright background use a ratio of number of dark pixels and a ratio of number of bright pixels to the number of outer area pixels respectively, and ensuring more accurate and proper determination compared with the determination using average luminance of outer area pixels. Specifically, in the determination using average luminance, the outer area or inner area used for the determination may locally have pixels with extreme luminance, which have an effect on the average luminance, and thus the determination on whether the area has dark pixels or bright pixels may fail to reflect the characteristic of the area. On the contrary, the determination using a ratio of number of pixels is performed based on whether either dark pixels or bright pixels dominate in the area, and thus can properly determine the characteristic of the area. The method using a ratio of number of pixels, which ensures proper determination of area having dark pixels and area having bright pixels, is suitable for determination of backlit portrait image that is required to have more accuracy.

The "person" in the first embodiment is not limited to a human, but may include, for example, a pet such as dog and cat, and a car as long as it is an object in the foreground. Such an object also has the problem that the details of the object cannot be expressed clearly since the object may have smaller luminance than that of background due to backlight.

Second Embodiment

Figure 8:
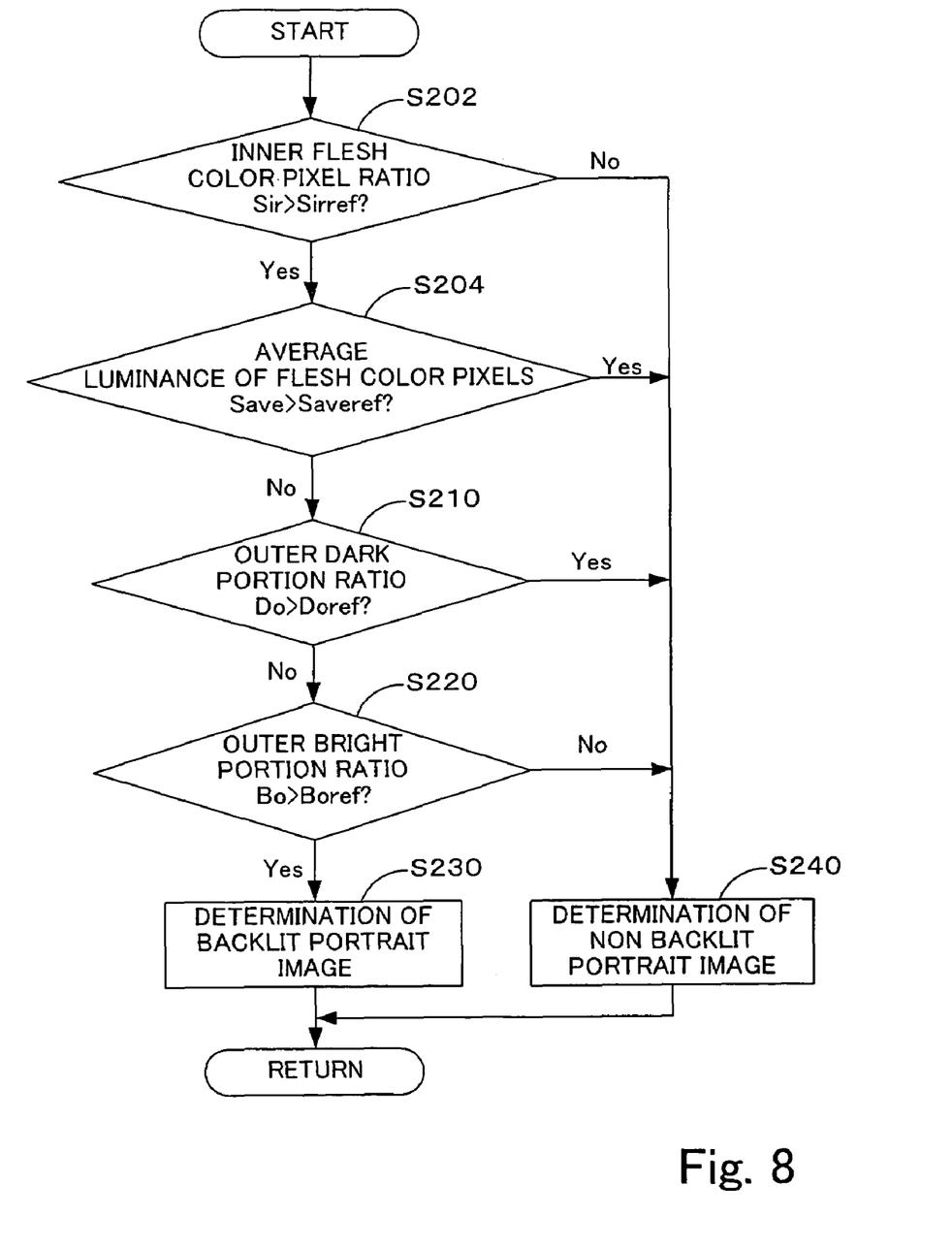
FIG. 8 is a flowchart showing a processing routine of backlit portrait image determination process according to a second embodiment.

A backlit portrait image determination process according to a second embodiment is described below with reference to FIG. 8. FIG. 8 is a flowchart showing a processing routine of backlit portrait image determination process according to the second embodiment. In the following description, steps of FIG. 8 identical with those of the first embodiment described above are assigned the same step numbers as those in the first embodiment and will not be explained further. In addition, an image processing device according to the second embodiment includes components identical with those of the image processing device according to the first embodiment, and thus such components are assigned the same reference symbols as those in the first embodiment and will not be explained further.

The backlit portrait image determination process according to the second embodiment initially determines whether the image data GD to be processed corresponds to a portrait image instead of the backlit portrait image determination step using the luminance distribution characteristic of the image data GD. If the image data GD to be processed is determined to be image data of portrait image, then it is determined whether the image data GD is image data of backlit image that was taken under a backlight condition. These two determination processes determines whether the shot image is a backlit portrait image.

The CPU 200 acquires a reference inner flesh color pixel ratio Sirref stored on the HDD 202 in advance, and then determines whether a ratio Sir of number of flesh color pixels to total number of pixels in the inner area, which has been calculated in advance, is larger than the reference inner flesh color pixel ratio Sirref (step S202). In general, the portrait image, which includes a person as major object, tends to have the person located in the center of the image. Therefore, a flesh color pixel ratio in an inner area of a typical portrait image data is used as the reference inner flesh color pixel ratio Sirref, and thereby the image data may be determined to be portrait image data if the ratio Sir of flesh color pixels to the inner area pixels is larger than the reference inner flesh color ratio Sirref. The determination on whether each pixel of the image data is a flesh color pixel may be made, for example, by determining that a pixel whose combination of R, G, and B values is within a predetermined range is a flesh color pixel.

If the CPU 200 has determined that the ratio Sir of number of flesh color pixels in the inner area is larger than the reference inner flesh color pixel ratio Sirref (Yes at step S202), it determines that the image data to be processed is image data of portrait image, and then determines whether average luminance Save of flesh color pixels is not larger than reference average luminance Saveref of flesh color pixels (step S204).

Specifically, the CPU 200 acquires the reference average luminance Saveref of flesh color pixels stored on the HDD 202 in advance, and then determines whether the calculated average luminance Save of flesh color pixels is not larger than the reference average luminance Saveref of flesh color pixels. The reference average luminance Saveref of flesh color pixels may include average luminance of flesh color pixels included in a typical backlit portrait image. Since flesh color pixels of backlit portrait image tends to have smaller luminance, the determination on whether the average luminance of flesh color pixels is smaller than the average luminance of flesh color pixels included in the backlit portrait image may lead to the determination on whether the image data to be processed is image data of backlit portrait image.

If the CPU 200 determines that the average luminance Save of flesh color pixels is not larger than the reference average luminance Saveref of flesh color pixels (No at step S204), it proceeds to steps S210 and S220, determines that the image data to be processed is image data of backlit portrait image (step S230) or image data of non-backlit portrait image (step S240), and then returns back to the processing routine shown in FIG. 2.

If the CPU 200 determines that the average luminance Save of flesh color pixels is larger than the reference average luminance Saveref of flesh color pixels (Yes at step S204), it determines that the image data to be processed is image data of non-backlit portrait image (step S240), and then returns back to the processing routine shown in FIG. 2.

As described above, the backlit portrait image determination process according to the second embodiment may use the ratio Sir of number of flesh color pixels to total number of pixels in the inner area to determine whether the image data to be processed is image data of portrait image, and use the average luminance Save of flesh color pixels to determine whether the image data to be processed is image data of backlit portrait image. This ensures proper determination on whether the image data to be processed is image data of portrait image and on whether the image data is image data of backlit portrait image.

Since the person is typically located at the center of the image in the portrait image that includes the person as major object, using the ratio Sir of number of flesh color pixels in the inner area ensures proper determination on whether the image data to be processed is image data of portrait image. In addition, using the ratio of number of pixels instead of the average luminance of flesh color pixels in the inner area ensures proper determination on whether there are flesh color pixels corresponding to the person in the inner area without being affected by influence among pixels. It is undesirable to perform image processing on an image that includes a person outside of the center of the image on the assumption that the image is a portrait image, but the present method may eliminate this problem.

Furthermore, since luminance of flesh color pixels is relatively smaller in whole in image data of backlit portrait image, using the average luminance Save of flesh color pixels ensures proper determination on whether the image data to be processed is image data of backlit portrait image.

Third Embodiment

Figure 9:
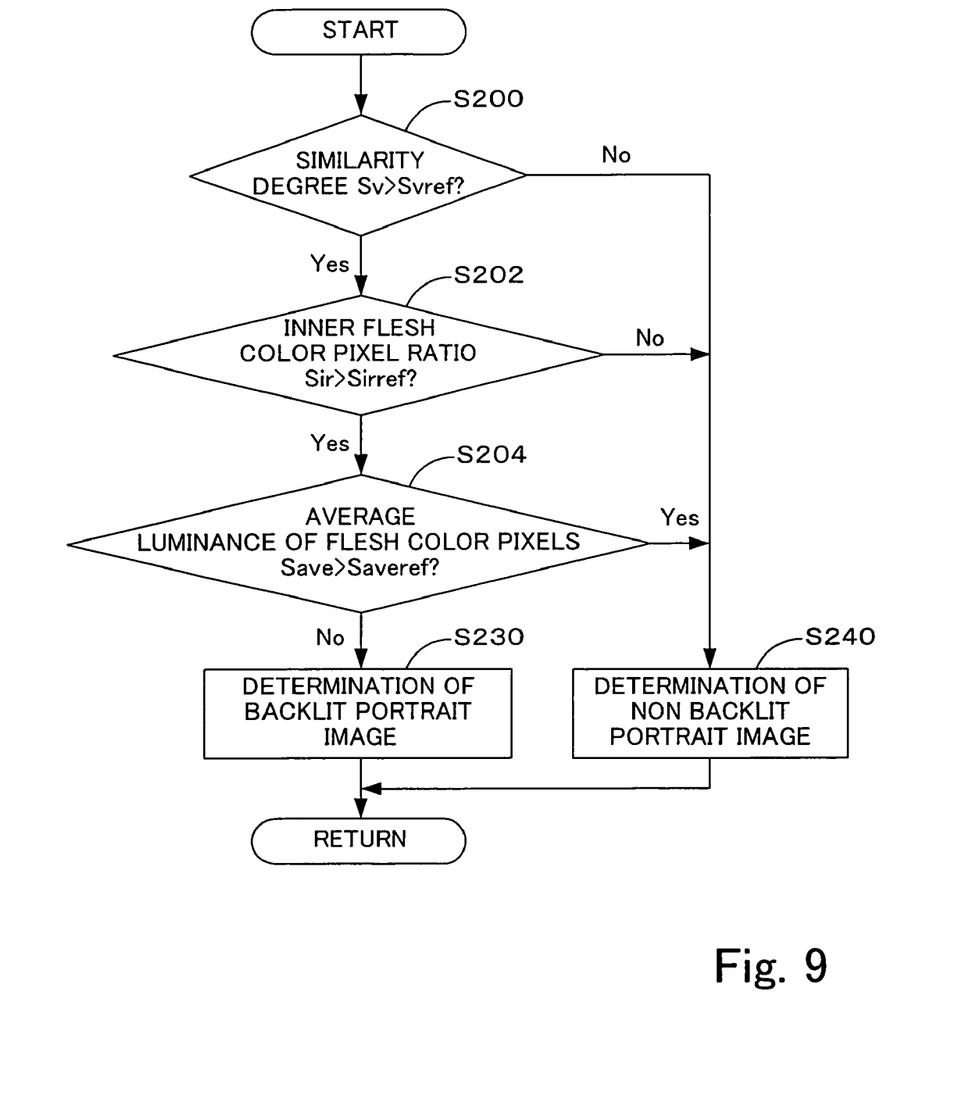
FIG. 9 is a flowchart showing a processing routine of backlit portrait image determination process according to a third embodiment.

A backlit portrait image determination process according to a third embodiment is described below with reference to FIG. 9. FIG. 9 is a flowchart showing a processing routine of backlit portrait image determination process according to the third embodiment. In the following description, steps of FIG. 9 identical with those of the first or second embodiment are assigned the same step numbers and will not be explained further. In addition, an image processing device according to the third embodiment includes components identical with those of the image processing device according to the first embodiment, and thus such components are assigned the same reference symbols as those in the first embodiment and will not be explained further.

The third embodiment uses the similarity degree to determine whether the image data to be processed is image data of backlit portrait image (step S200), and then in order to confirm the validity of the determination using the similarity degree, determines whether the ratio Sir of number of flesh color pixels in the inner area is larger than the reference inner flesh color ratio Sirref (step 202), and determines whether the average luminance Save of flesh color pixels is not larger than the reference average luminance Saveref of flesh color pixels (step S204).

The CPU 200 determines based on the determinations of steps S200, S202, and S204 that the image data to be processed is image data of backlit portrait image (step S230) or image data of non-backlit portrait image (step S240), and then returns back to the processing routine shown in FIG. 2.

As described above, the backlit portrait image determination process according to the third embodiment can properly determine whether the image data to be processed is image data of backlit portrait image as described in the first and second embodiments.

Other Embodiments

Although both the ratio Sir of number of flesh color pixels in the inner area and the average luminance Save of flesh color pixels are used in the above-described embodiments, only either one of them may be used. The reason is that in some cases only either one of them may enable the portrait image determination process using flesh color pixels to be performed.

Although the personal computer 20 is used as the image processing device to perform the image processing in the above-described embodiments, other devices may alternatively be used as the image processing device, for example, including a stand-alone type printer having the function of image processing where the image processing is performed by the printer. Alternatively, the present invention may also be embodied as a printer driver or image processing application (program) without any hardware configuration including the image processing device.

In addition to the determination factors of backlit portrait image in the above-described embodiments, another backlit portrait image determination step may be added that acquires a number of higher color saturation pixels, which have higher color saturation than a predetermined one, in the outer or inner area, and then determines based on a ratio of higher color saturation pixels to total number of pixels. For example, if the ratio of number of higher color saturation pixels to total number of pixels is high, performing the process for raising brightness, which is commonly used as image processing for backlit portrait image, on the image data causes an image obtained as output result to have lower color saturation and thus poor impression. Therefore, the image may be determined to be non-backlit portrait image if the ratio of number of higher color saturation pixels to total number of pixels is high, and thereby avoiding the image processing suitable for backlit portrait image.

It should be appreciated that the image processing performed by the personal computer 20 may include various adjustments such as contrast adjustment and color adjustment as well as the brightness adjustment. In such a case, the CPU 200 analyzes the image data on a pixel-by-pixel basis to acquire a variety of characteristic parameter values indicating characteristics of image data, for example, image statistics such as minimum luminance, maximum luminance, and brightness representative value. The CPU 200 calculates an amount of correction for each of the parameters so as to eliminate or reduce the difference between reference values preset for the respective characteristic parameters that are stored on the HDD 202 and the image statistics that are acquired through the analysis, and thereby corrects R, G, and B values of the image data. The correction of image data may be performed by applying the calculated amount of correction to a tone curve, which defines the relationship of input values and output values, and then by using the corrected tone curve to modify R, G, and B values of each pixel included in the image data.

Although the image processing device, and the method and program for backlit portrait image determination according to the present invention have been described above with reference to the embodiments, these embodiments are simply intended to facilitate understanding of the present invention but does not limit the present invention. The present invention may be modified and improved without departing from the spirit and the scope of claim for patent, and includes any equivalent thereof.

What is claimed is:

1. A method of determining based on image data whether an image is a backlit image, the method comprising using a processor to perform operations of:
   acquiring the image data;
   analyzing the acquired image data to determine whether the image is a backlit image;
   analyzing the acquired image data to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the image;
   analyzing the acquired image data to determine whether a ratio of number of bright outer area pixels having luminance not smaller than the reference luminance to the total number of outer area pixels is not smaller than a second predetermined value; and
   concluding that the image is a backlit image if the image is determined to be a backlit image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value,
   wherein the determination whether the image is a backlit image includes:
   determining whether a ratio of number of flesh color pixels among the inner area pixels to the total number of the inner area pixels is not smaller than a third predetermined value;
   determining whether average luminance of flesh color pixels among the inner area pixels and the outer area pixels is not larger than a fourth predetermined value; and
   determining that the image is a backlit image if the ratio of number of flesh color pixels among the inner area pixels to the total number of the inner area pixels is not smaller than the third predetermined value, and the average luminance of flesh color pixels among the inner area pixels and the outer area pixels is not larger than the fourth predetermined value.

2. A method of determining based on image data whether an image is a backlit image, the method comprising using a processor to perform operations of:
   acquiring the image data; and
   analyzing the acquired image data to determine whether the image is a portrait image,
   if a shot image is determined to be a portrait image, the method further comprising:
   analyzing the acquired image data to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image,
   analyzing the acquired image data to determine whether a ratio of number of bright outer area pixels having luminance not smaller than the reference luminance to the total number of outer area pixels is not smaller than a second predetermined value, and
   determining that the image is a backlit image if the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value,
   wherein the determination whether the image is a portrait image is based on a ratio of number of flesh color pixels among the inner area pixels to the total number of the inner area pixels, and determines that the image is a portrait image if the ratio of number of flesh color pixels among the inner area pixels to the total number of the inner area pixels is not smaller than a third predetermined value.

3. A method according to one of claim 1 and 2, wherein the reference luminance includes dark pixel reference luminance for the determination of dark pixel and bright pixel reference luminance for the determination of bright pixel.

4. A method of determining based on image data whether an image is a backlit image, the method comprising using a processor to perform operations of:
   acquiring the image data;
   analyzing the acquired image data to acquire a luminance distribution characteristic of the image data;
   comparing the acquired luminance distribution characteristic with reference a luminance distribution characteristic for backlit image determination prepared in advance;
   determining whether a ratio of number of flesh color pixels among inner area pixels to total number of the inner area pixels is not smaller than a first predetermined value, the inner area pixels constituting image data corresponding to a central portion of the shot image;
   determining whether average luminance of flesh color pixels among the inner area pixels and outer area pixels is not larger than a second predetermined value, the outer area pixels being other than the inner area pixels among all pixels constituting the image data; and
   determining that the image is a backlit image if the acquired luminance distribution characteristic is similar to the reference luminance distribution characteristic for backlit portrait image determination, the ratio of number of flesh color pixels among the inner area pixels to the total number of the inner area pixels is not smaller than the first predetermined value, and the average luminance of flesh color pixels among the inner area pixels and the outer area pixels is not larger than the second predetermined value.

5. An image processing device for determining based on image data whether an image is a backlit image, the image processing device comprising:
   an image data acquisition module for acquiring the image data;
   a backlit image determination module for analyzing the acquired image data to determine whether the image is a backlit image;
   a dark pixel ratio determination module for analyzing the acquired image data to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image;
   a bright pixel ratio determination module for analyzing the acquired image data on a pixel-by-pixel to determine whether a ratio of number of bright outer area pixels having luminance not smaller than the reference luminance to the total number of outer area pixels is not smaller than a second predetermined value; and
   a backlit image confirmation module for confirming that the image is a backlit image if the image is determined to be a backlit image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value,
   wherein the backlit image determination module further comprises:
   an inner flesh color pixel ratio determination module for determining whether a ratio of number of flesh color pixels among the inner area pixels to the total number of the inner area pixels is not smaller than a third predetermined value; and
   an inner area pixel average luminance determination module for determining whether average luminance of flesh color pixels among the inner area pixels and the outer area pixels is not larger than a fourth predetermined value, and
   determines that the image is a backlit image if the ratio of number of flesh color pixels among the inner area pixels to the total number of the inner area pixels is not smaller than the third predetermined value, and the average luminance of flesh color pixels among the inner area pixels and the outer area pixels is not larger than the fourth predetermined value.

6. An image processing device for determining based on image data whether an image is a backlit image, the image processing device comprising:
   an image data acquisition module for acquiring the image data;
   a portrait image determination module for analyzing the acquired image data to determine whether the image is a portrait image;
   a dark pixel ratio determination module for analyzing the acquired image data to determine whether a ratio of number of dark outer area pixels having luminance not larger than reference luminance to total number of outer area pixels is not larger than a first predetermined value, the outer area pixels being other than inner area pixels among all pixels constituting the image data, the inner area pixels constituting image data corresponding to a central portion of the shot image;
   a bright pixel ratio determination module for analyzing the acquired image data to determine whether a ratio of number of bright outer area pixels having luminance not smaller than the reference luminance to the total number of outer area pixels is not smaller than a second predetermined value; and
   a backlit image determination module for determining that the image is a backlit image if the image is determined to be a portrait image, the ratio of number of dark outer area pixels having luminance not larger than the reference luminance to the total number of outer area pixels is not larger than the first predetermined value, and the ratio of number of bright outer area pixels having luminance not smaller than the reference luminance to the total number of outer area pixels is not smaller than the second predetermined value,
   wherein the portrait image determination module further comprises:
   an inner color pixel ratio determination module for determining based on a ratio of number of flesh color pixels among the inner area pixels to the total number of the inner area pixels, and
   determines that the image is a portrait image if the ratio of number of flesh color pixels among the inner area pixels to the total number of the inner area pixels is not smaller than the third predetermined value.

7. An image processing device according to one of claims 5 and 6, wherein the reference luminance includes dark pixel reference luminance for the determination of dark pixel and bright pixel reference luminance for the determination of bright pixel.

8. An image processing device for determining based on image data whether an image is a backlit image, the image processing device comprising:
   an image data acquisition module for acquiring the image data;
   a luminance distribution characteristic analysis module analyzing the acquired image data to acquire a luminance distribution characteristic of the image data;
   a comparison module for comparing the acquired luminance distribution characteristic with a reference luminance distribution characteristic for backlit image determination prepared in advance;
   an inner flesh color pixel ratio determination for determining whether a ratio of number of flesh color pixels among inner area pixels to total number of the inner area pixels is not smaller than a first predetermined value, the inner area pixels constituting image data corresponding to a central portion of the shot image;
   a flesh color pixel average luminance determination module for determining whether average luminance of flesh color pixels among the inner area pixels and outer area pixels is not larger than a second predetermined value, the outer area pixels being other than the inner area pixels among all pixels constituting the image data; and
   a backlit image determination module for determining that the image is a backlit image if the acquired luminance distribution characteristic is similar to the reference luminance distribution characteristic for backlit image determination, the ratio of number of flesh color pixels among the inner area pixels to the total number of the inner area pixels is not smaller than the first predetermined value, and the average luminance of flesh color pixels among the inner area pixels and the outer area pixels is not larger than the second predetermined value.

9. An image processing device according to one of claims 5 and 6 further comprising:

a brightness correction module for performing brightness connection suitable for backlit image if the image is determined to be a backlit image.

* * * * *